(12) United States Patent
Tidestav

(10) Patent No.: US 8,229,361 B2
(45) Date of Patent: Jul. 24, 2012

(54) NOISE ESTIMATION IN WIRELESS COMMUNICATION SYSTEMS

(75) Inventor: Claes Tidestav, Balsta (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 999 days.

(21) Appl. No.: 11/913,435

(22) PCT Filed: May 3, 2005

(86) PCT No.: PCT/SE2005/000651
§ 371 (c)(1),
(2), (4) Date: Nov. 2, 2007

(87) PCT Pub. No.: WO2006/118498
PCT Pub. Date: Nov. 9, 2006

(65) Prior Publication Data
US 2008/0198910 A1    Aug. 21, 2008

(51) Int. Cl.
*H04B 1/00* (2006.01)

(52) U.S. Cl. .......... 455/63.1; 455/67.11; 455/67.12; 455/67.13; 455/226.1; 455/296; 375/226

(58) Field of Classification Search .... 455/67.11–67.13, 455/226.1–226.4, 63.1, 296; 375/226
See application file for complete search history.

(56) References Cited

U.S. PATENT DOCUMENTS

| | | | |
|---|---|---|---|
| 3,351,853 A * | 11/1967 | Wood | 324/614 |
| 7,280,617 B2 * | 10/2007 | Cuje et al. | 375/319 |
| 2002/0153891 A1 * | 10/2002 | Smith et al. | 324/309 |
| 2006/0068717 A1 * | 3/2006 | Gandhi et al. | 455/67.13 |

* cited by examiner

*Primary Examiner* — Lana N Le
*Assistant Examiner* — Hsin-Chun Liao

(57) ABSTRACT

The invention relates to background noise estimation in wireless communication systems with power control. The total received interference is measured at a receiving unit. Thereafter, a predetermined noise signal is injected at the receiving unit and the total received interference is measured again, preferably when the power control of the system has responded to the noise injection. The background noise is calculated based on the injected predetermined noise signal and the interference measurements before and after the noise injection.

29 Claims, 5 Drawing Sheets

NOISE ESTIMATION IN WIRELESS COMMUNICATION SYSTEMS

TECHNICAL FIELD

The present invention generally relates to wireless communication systems with power control and in particular to noise estimation in such systems.

BACKGROUND

In wireless communication systems of today, such as WCDMA and other CDMA systems, control of the uplink load is very important. If the uplink load becomes too high, the system may become unstable and it becomes impossible for users to maintain their quality targets. This causes an uplink "power rush", in which users repeatedly raise their transmit powers until they are transmitting at full transmit power in futile attempts of reaching a stable situation where all users have adequate quality.

Various radio resource management (RRM) algorithms have been developed in order to avoid the above situation. Such RRM algorithms act on load measurements to control the uplink load and for example include:

Admission control: if the load exceeds a certain limit, new users are denied access to the system, rather than jeopardizing the system stability.

Congestion control: in situations where overload still occurs, congestion control reduces the load by terminating connections.

Rate control: by reducing the transmission rates of one or several users, the system load can be controlled.

Scheduling: by explicitly granting individual users or groups of users permission to transmit, the load can be maintained at a predetermined level.

To execute these functions, the load must be known with sufficient accuracy. In CDMA systems in general and WCDMA systems in particular, the best measure of the uplink load is the so-called noise rise or Rise-over-Thermal (RoT), which is defined as:

$$\eta = \frac{I_{tot}}{N}, \quad \text{(Eq. 1)}$$

where $I_{tot}$ is the total received power and N is the power of the background noise. N includes thermal noise, man-made noise, e.g. noise generated by spark plugs, as well as adjacent channel interference. $I_{tot}$ includes the background noise N but also interference generated by mobile terminals, both within and outside a cell.

In order to estimate RoT, estimations of $I_{tot}$ and N are thus needed. Assuming that it is possible to measure $I_{tot}$ with sufficient accuracy, the problem is to estimate the background noise N. No method of actually separating the background noise from the interference of the mobiles is known. In view of this, at first thought the solution would be to measure N when there is no traffic in the system, for example at nighttime. However, the day and night noise power typically varies considerably. Man-made noise is for example generally present to a much higher extent at daytime and there may also be variations in the thermal noise due to daily temperature variations. Therefore, noise measurements made at nighttime may not be representative of the daytime background noise.

Thus, it would be desirable to instead measure the noise level when it is needed. In the prior art, it has been proposed to interrupt all uplink transmissions in the system for short periods of time in order to measure the background noise. However, such a solution is associated with a number of problems. Firstly; it requires that the system is synchronized, i.e. that all users and nodes share a common time reference. For example, in cdma2000 the base stations are synchronized and it is possible to instruct all mobiles to cease transmitting for a short period of time in order to measure the background noise. Other systems, including WCDMA, are not that accurately synchronized, and the silent periods would have to be too long to guarantee that all mobiles are silent at the same time. This would lead to an unacceptably large capacity loss, since no data can be transmitted during the silent periods. Thus, the solution with silent periods cannot be used in asynchronous systems, which is a major drawback.

Moreover, introducing silent periods may prove prohibitively complex even in a synchronous system. Standardization would be required in order to enable the silent periods. Still another drawback is that the transmission interruptions may impact the network performance such that the quality of service is degraded.

Accordingly, no satisfactory solution for background noise estimation or RoT estimation has been presented in conventional telecommunication systems and there is a considerable need for an improved noise estimation mechanism.

SUMMARY

A general object of the present invention is to enable improved load estimations in telecommunication networks. A specific object is to provide improved background noise estimations in wireless communication systems with power control. Another object is to provide a mechanism for background noise estimation suitable for use both in asynchronous and synchronous systems.

These objects are achieved in accordance with the attached claims.

A method for background noise estimation in wireless communication systems with power control is provided. Briefly, an additional noise is injected in the receiver chain, causing the power-controlled interference sources of the system to adapt their transmit powers. The resulting increase in the total interference level is used to estimate the power of the background noise. A new equation is defined for background noise estimation based on the power of the injected noise and the total interference before and after the injection. The equation is based on the assumption of a substantially constant noise rise parameter. For cases where the noise rise varies it is proposed to apply an averaging procedure to compensate for the noise rise variations.

For implementational reasons, the noise is preferably injected as late in the receiver chain as possible, typically at base band. The noise signal is held at a higher level for a certain period of time and at a lower level for a certain period of time. The most simple cases uses a step signal or an impulse-like ("single wave") signal, but generally a signal with repeated noise pulses or waves is preferred in order to calculated the background noise over a time interval.

In a multi-cell communication system, it is preferred to synchronize the noise injecting such that predetermined noise signals are injected into substantially all cells of the multi-cell communication system substantially simultaneously.

Using WCDMA terminology, the calculations of the background noise can in an uplink scenario be performed at Node B, or alternatively at RNC based on parameters measured at Node B.

The background noise estimations obtained with the present invention can with advantage be used to estimate the uplink (or downlink) load, e.g. expressed through the noise rise. The obtained improved load estimations enable enhanced radio resource management and control of the uplink load.

The present invention is associated with a number of advantages, including:
- estimation of background noise also in asynchronous systems, such as WCDMA;
- estimation of background noise in a comparatively simple manner;
- minimized impact on network performance and quality;
- on-line noise estimation;
- no need for standardization; and
- noise estimation through simple implementational actions.

According to other aspects of the invention, a receiving unit, a control unit and a wireless communication system with means for estimation of background noise are provided.

BRIEF DESCRIPTION OF THE DRAWINGS

The invention, together with further objects and advantages thereof, is best understood by reference to the following description and the accompanying drawings, in which.

DETAILED DESCRIPTION

The present invention will primarily be described with reference to an uplink scenario, where the noise rise is a measure of the uplink load. However, noise rise is also an important measure of downlink load (although other resources generally are more limiting) and it is to be understood that the proposed noise estimation procedure is applicable also on the downlink, i.e. can be implemented in the mobile terminal.

Moreover, reference will often be given to WCDMA communication and WCDMA networks. Still, it should be emphasized that the present invention is very well applicable also in connection with other multi-node systems, and even two-node systems (links), with power control.

The expressions "injecting noise", "noise injection", etc. will herein be used to refer to the process of introducing an amount of additional noise (i.e. adding noise of a certain power) to the system, typically for limited period of time.

Figure 1:
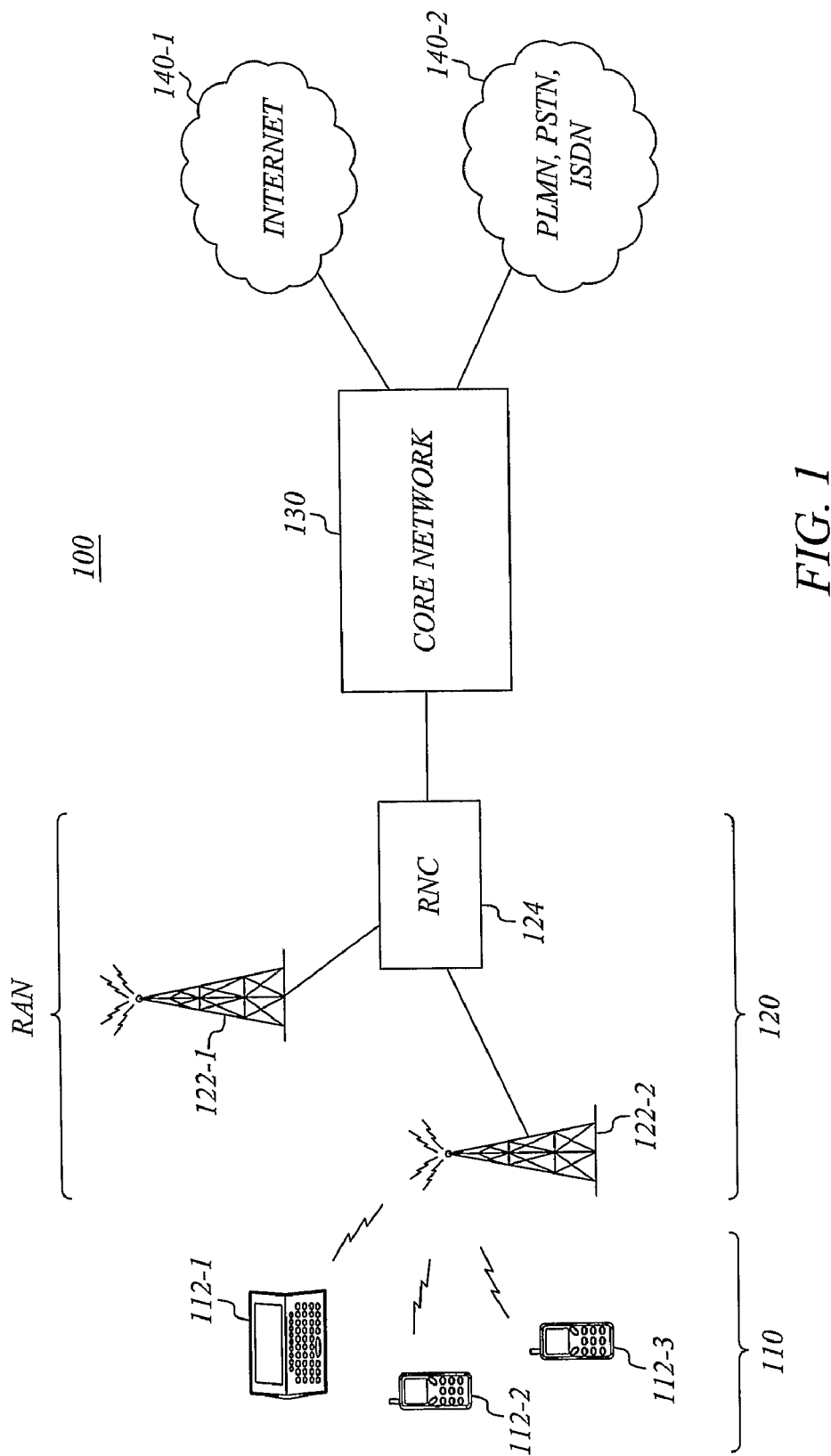
FIG. 1 is a schematic overview of an example WCDMA communication system in which the present invention can be used.

FIG. 1 is a schematic overview of an example WCDMA communication system in which the present invention can be used. The illustrated system 100 comprises a Radio Access Network (RAN), e.g. a Universal Terrestrial Radio Access Network (UTRAN), and a core network 130. The RAN performs radio-related functions and is responsible for establishing connections between user equipment/mobile terminals 112, such as mobile phones and laptops, and the rest of the network. The RAN typically contains a large number of Node B 122, sometimes also referred to as base stations, and Radio Network Controllers (RNC) 124. Each Node B serves the mobile terminals within its respective coverage area and several Node B are controlled by a RNC. Typical functions of the RNC are to assign frequencies, spreading or scrambling codes and channel power levels.

The RNC 124 provides access to the core network 130, which e.g. comprises switching centers, support nodes and databases, and generally also some multimedia processing equipment. The core network communicates with external networks 140, such as the Internet, and Public Switched Telephone Networks (PSTN), Integrated Services Digital Networks (ISDN) and other Public Land Mobile Networks (PLMN). In practice, most WCDMA networks present multiple network elements and nodes arranged in much more complex ways than in the basic example of FIG. 1.

The communication over a wireless communication link in a system like the illustrated communication system occurs from a transmitting unit at a transmitting side to a receiving unit at a receiving side. In FIG. 1, this means that a PDU in an uplink scenario is send from a transmitting side 110 comprising the user equipment (terminal) 112 to a receiving side 120 comprising the receiving unit Node B 122 and the control unit RNC 124. In a downlink scenario, on the other hand, the transmitting side 120 is the side of the radio access network with the transmitting unit Node B 122 and the control unit RNC, whereas the receiving unit is the terminal 112 at the receiving side 110.

As explained in the background section, it is desirable to obtain accurate estimates of the background noise level in wireless systems like the WCDMA system of FIG. 1. Prior art methods are associated with severe drawbacks. Introducing silent periods in order to perform noise measurements when the measurement is needed, i.e. during busy hours, is for example impossible in an asynchronous system, since there is no common time reference among different base stations. Even in a synchronous system, such a solution is not satisfactory due to its complexity and due to the fact that it may result in bad network performance and degraded quality of service.

The present invention recognizes the fact that the background noise represents the power of all interference sources that are not power-controlled, whereas the total received interference includes the background noise as well as the interference generated by the mobile terminals, which are power-controlled. The power control means that the mobile terminals will adjust their respective transmit powers in response to changes in the transmission environment to meet a certain control objective (quality target) at the receiver. A wireless communication system in accordance with the present invention is generally associated with power control dependent on the interference level of the system, normally C/I-based power control.

These system features are used by the invention to overcome the limitations of the prior-art solutions and provide good estimations the background noise without interfering with the normal operation of the system. This is achieved by injecting a comparatively small amount of additional noise into the system for a short period. An additional noise is introduced in the receiver chain and due to this noise insertion, the mobiles in the system will increase their powers to fulfil their respective quality targets. This will cause an increase in the total interference level, determined through measurements before and after the injection. From this increase and knowledge of the power of the inserted noise, it becomes possible to calculate the power of the background noise through a new equation for noise estimation defined below.

A major advantage associated with the noise injection mechanism of the present invention is that it provides estimation of the background noise level in asynchronous cellular systems in operation. For synchronous systems, the proposed method is simpler than to introduce silent periods, and the quality impacts are smaller.

The principles of the background noise calculation in accordance with the present invention will now be described more in detail with reference to FIG. 2.

Figure 2:
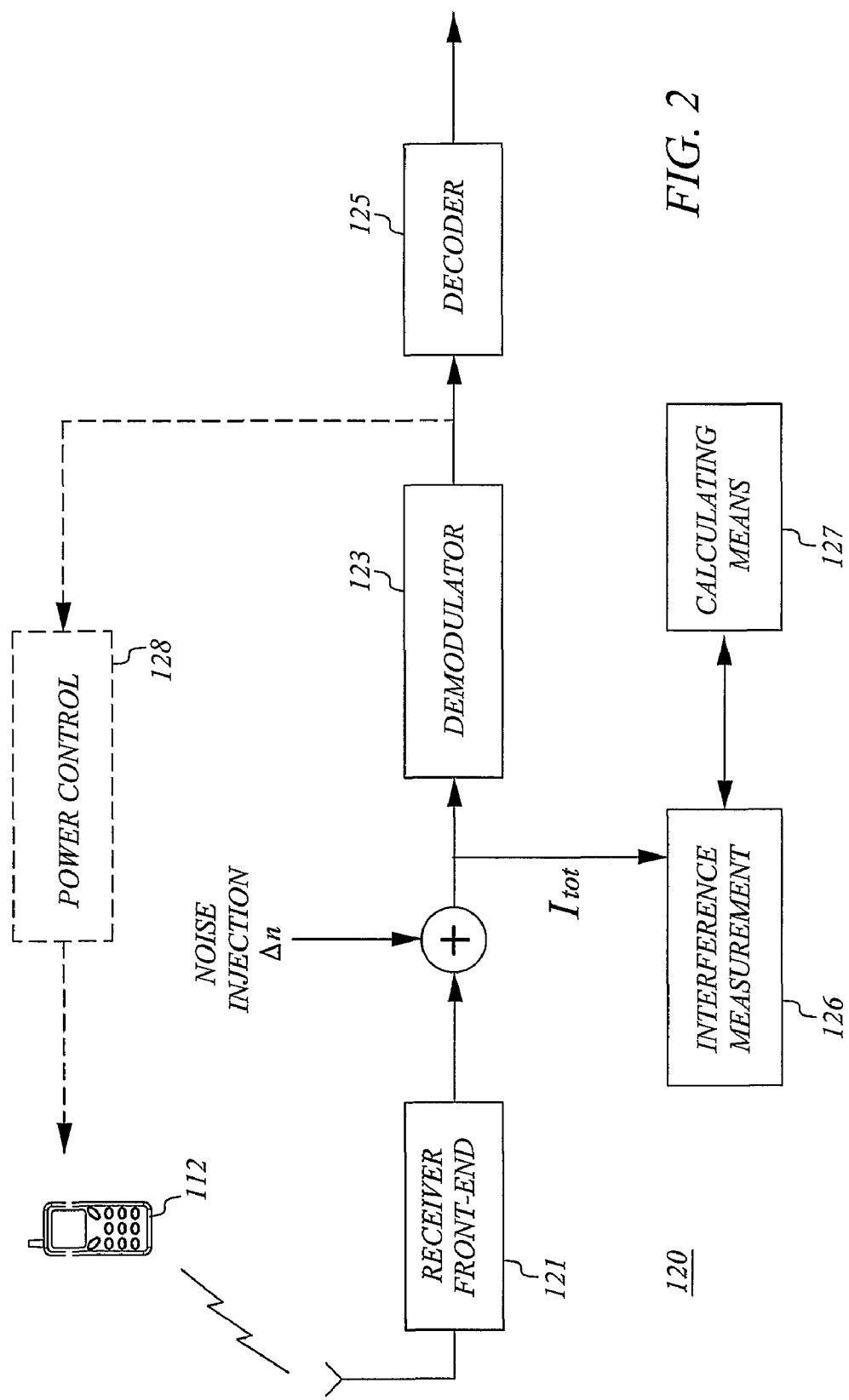
FIG. 2 is a schematic block diagram illustrating a receiver architecture according to an example embodiment of the present invention.

An additional noise is introduced in the receiver chain (in FIG. 2 comprising a receiver front-end 121, a demodulator 123 and a decoder 125). This causes the power-controlled sources, illustrated by the mobile terminal 112, to adapt their transmit powers (see power control block 128) and thereby gives rise to a change (increase) in the total received interference. The total interference $I_{tot}$ is measured by means 126 for interference measurement before and after introducing the additional noise. Based on the change in the total interference level, calculating means 127 thereafter calculates the power of the background noise as described below.

The following notation is introduced:
$I_0$: the total interference measured before injection of additional noise
$I_1$: the total interference measured after injection of additional noise
$\Delta n$: the power of the injected noise With the above definitions, it is realized that the background noise after the noise injection becomes $N+\Delta n$, where N is the power of the background noise before the noise injection.

It has been recognized that the power control adapts to the changed interference condition caused by the injected noise such that RoT under mild conditions is unaffected by the noise injection. It may thus be assumed that $$\frac{I_0}{N} = \frac{I_1}{N + \Delta n} \quad (\text{Eq. 2})$$

Rearranging (Eq. 2) we obtain $$N = \frac{I_0}{I_1 - I_0} \Delta n \quad (\text{Eq. 3})$$

In this way, an elegant solution to the problem of background noise estimation is achieved, since the background noise easily can be calculated, using (Eq. 3), based on the power of the injected noise and the measurements of the total received interference before and after the noise injection.

For the above equations to be accurate, when the noise has been injected it is important that the power control is allowed to stabilize before performing the second interference measurement. At the same time, it is important not to wait too long with the second interference measurement, since new users may start transmitting at any time instant, effectively increasing the RoT. Preliminary investigations indicate that for large loads it can take up to 50 ms for the interference measurement to stabilize, whereas for lower loads it will normally be sufficient to wait 20 ms.

Still referring to FIG. 2, it is preferred to modify the receiver architecture according to the basic principles of the drawing. For implementational reasons, the noise should be injected as late in the receiver chain as possible, preferably at base band. In FIG. 2, the predetermined noise signal is added to the output signal of the receiver front-end 121 before it is forwarded to the demodulator 123. The receiver front-end typically comprises radio-frequency down-conversion and sampling. However, the skilled person realizes that there are a number of alternative receiver implementations and receiver architectures with differently arranged elements also lie within the scope of the invention.

As mentioned, the invention can be used both in uplink and downlink scenarios, for example with the receiving unit of FIG. 2 arranged in the Node B/base station and the mobile terminal/user equipment, respectively.

Figure 3:
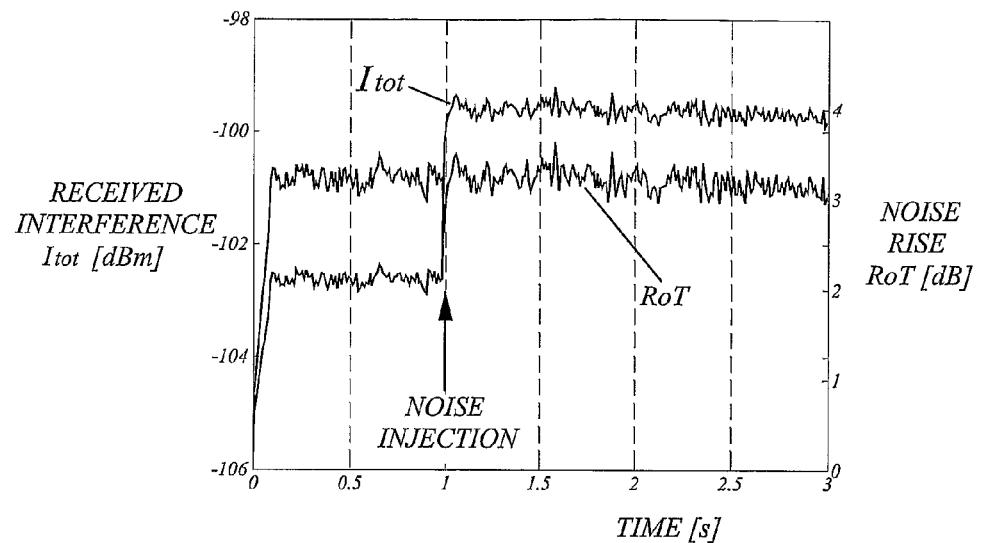
FIG. 3 illustrates a simulated example system response, in $I_{tot}$ and RoT, respectively, to a noise injection in accordance with an example embodiment of the present invention.

FIG. 3 illustrates a simulated example system response, in $I_{tot}$ and RoT, respectively, to a noise injection in accordance with an example embodiment of the present invention. The example describes the performance of one cell in a system with 21 cells. The system is loaded to about 50%, i.e. the rise over thermal is 3 dB. At time t=1.0 s, an additional noise is injected. In this case the noise addition is such that the background noise is increased from a first level to a second level, i.e. the injected predetermined noise signal is a step signal.

It is evident from FIG. 3 that the RoT is unaffected by the noise addition. Both before and after the injection, the RoT is 3 dB. The received interference, on the other hand, increases from a first level $I_0$=−102.5 dBm to a second level $I_1$=−99.5 dBm in response to the noise injection. Using (Eq. 3), the background noise level N for the system as experienced at the receiver side is obtained.

The example of FIG. 3 is very useful for the understanding of the principle of the present invention. In practice, few system will behave in the idealized manner illustrated therein, though. More specifically, the simulation providing the step response of FIG. 3 assumes that the noise is injected into all cells of the system simultaneously, requiring at least some degree of synchronization. Furthermore, the uplink receiver diversity is switched off. Finally, the studied system consists only of omni cells, excluding the possibility of softer handover.

When one or more of the above conditions is violated, the noise rise will not remain constant in time but instead vary. Such a situation will now be described with reference to FIG. 4.

Figure 4:
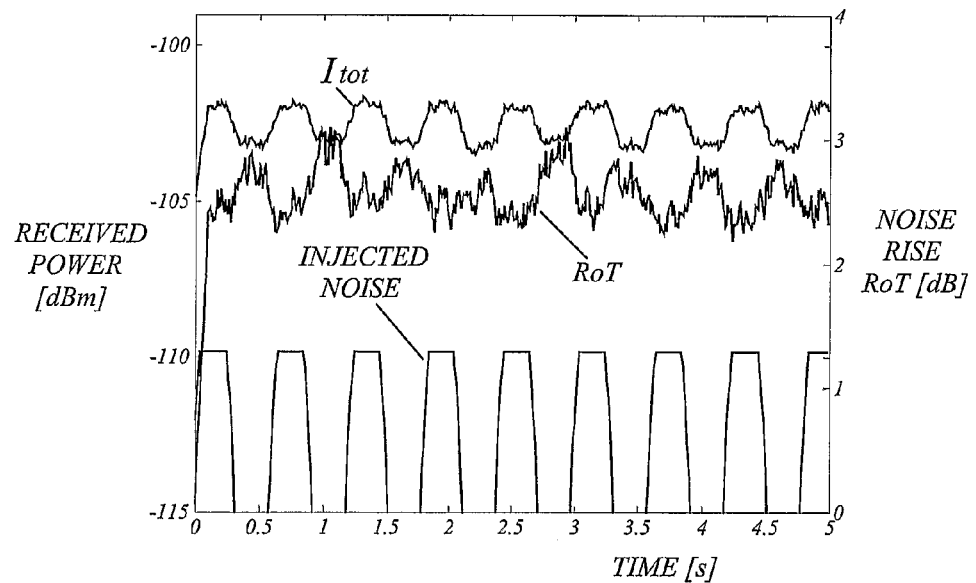
FIG. 4 illustrates another simulated example system response, in $I_{tot}$ and RoT, respectively, to a noise injection in accordance with another example embodiment of the present invention.

FIG. 4 discloses an example performance for a situation with receiver diversity as well as noise injection only in some cells. Graphs of the simulated example system response, in $I_{tot}$ and RoT, respectively, as well as the injected noise signal are shown.

Here, a more elaborate scheme for noise injection is used. The injected noise signal varies according to a "chopped" triangle wave, as shown in FIG. 4. Such a noise signal is repeatedly held at a higher level for a certain period of time and at a lower level for a certain period of time. The changes between levels are not instantaneous but has a certain duration in time.

It is clear that the noise rise varies in the illustrated situation. In cases like this, the present invention proposes to apply an averaging procedure. It is for example possible to still use the above equation (Eq. 3) to calculate the background noise repeatedly, whereby a sequence of estimates is obtained. The estimates are then combined into a final estimate of the background noise level. As an example, an arithmetic mean of the sequence of estimates could be formed, but other averaging procedures, well-known in the art, may also be used to handle the situation with a varying noise rise and determine the background noise according to the present invention.

It has been shown that, by means of a rather simple averaging procedure it is possible to obtain relatively accurate estimates of the background noise even with a RoT that is not constant in time. In the simulation of FIG. 4, an estimation error smaller than 20% was achieved. This implies that the principles of the invention are very well applicable also on non-ideal situations with a varying RoT. In particular, it is preferred to inject predetermined noise signals into as many as possible, and preferably all, cells of a multi-cell system substantially simultaneously in order to obtain the best results. However, with an averaging procedure a satisfactory noise estimation can be achieved even if the noise is not injected into all cells simultaneously.

The injected noise of the example in FIG. 4 has a comparatively low power (about 7 dB lower than the total interference). This is an advantageous feature since it makes the impact of the noise addition on the coverage quite small.

Figure 5A:
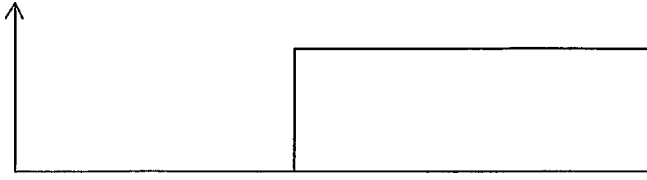
FIG. 5A-E are examples of noise signals that can be used for background noise estimation in accordance with the present invention.
Figure 5B:
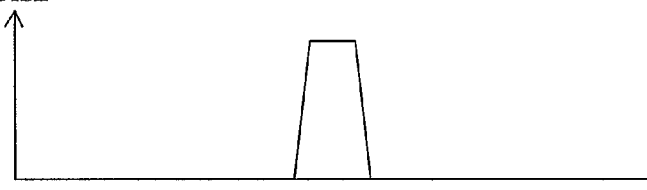
Figure 5C:
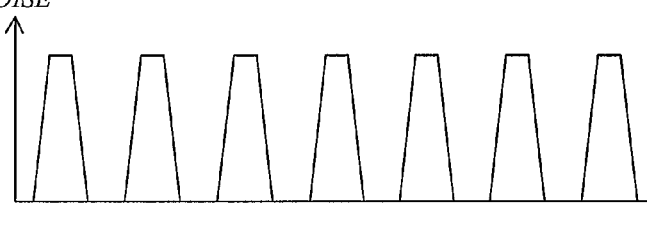
Figure 5D:
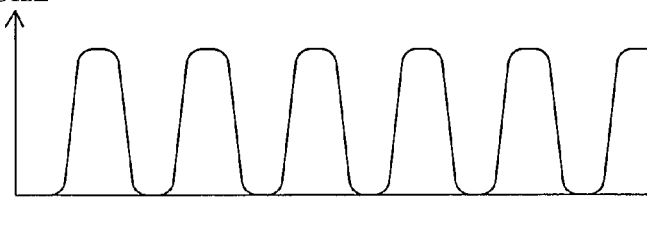
Figure 5E:
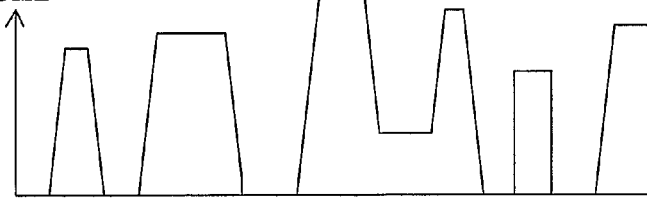

FIG. 5A-E are examples of noise signals that can be used for background noise estimation in accordance with the present invention. The injected noise should be at a lower level, such as a zero value, for a period of time and at a higher level for a period of time. The most simple cases use a step signal (FIG. 5A) or an impulse-like signal (FIG. 5B), but generally a signal with repeated noise pulses (FIG. 5C-E) would be preferred in order to calculated the background noise over a time interval. The chopped triangle wave of FIG. 5C, corresponding to the input signal of FIG. 4, would be very useful to get an appropriate background noise estimate but, as illustrated by FIG. 5D, a smooth curve is also possible. Moreover, FIG. 5E illustrates the fact that the higher and lower noise levels and/or the duration of the pulses need not be constant. Different kinds of noise signals comprising a signal portion that provides a rise between two levels and being kept substantially at each of the respective levels for a period of time can be used.

As for the period of time at the noise levels, in particular the higher level, it should be long enough for the power-control in the system to stabilize. Normally, a predetermined period of time (or several periods of time) is selected based on measurements or knowledge of system behavior. There may also be embodiments, where this parameter is determined continuously based on on-line measurements indicating the response time of the power control mechanism in the system.

Figure 6:
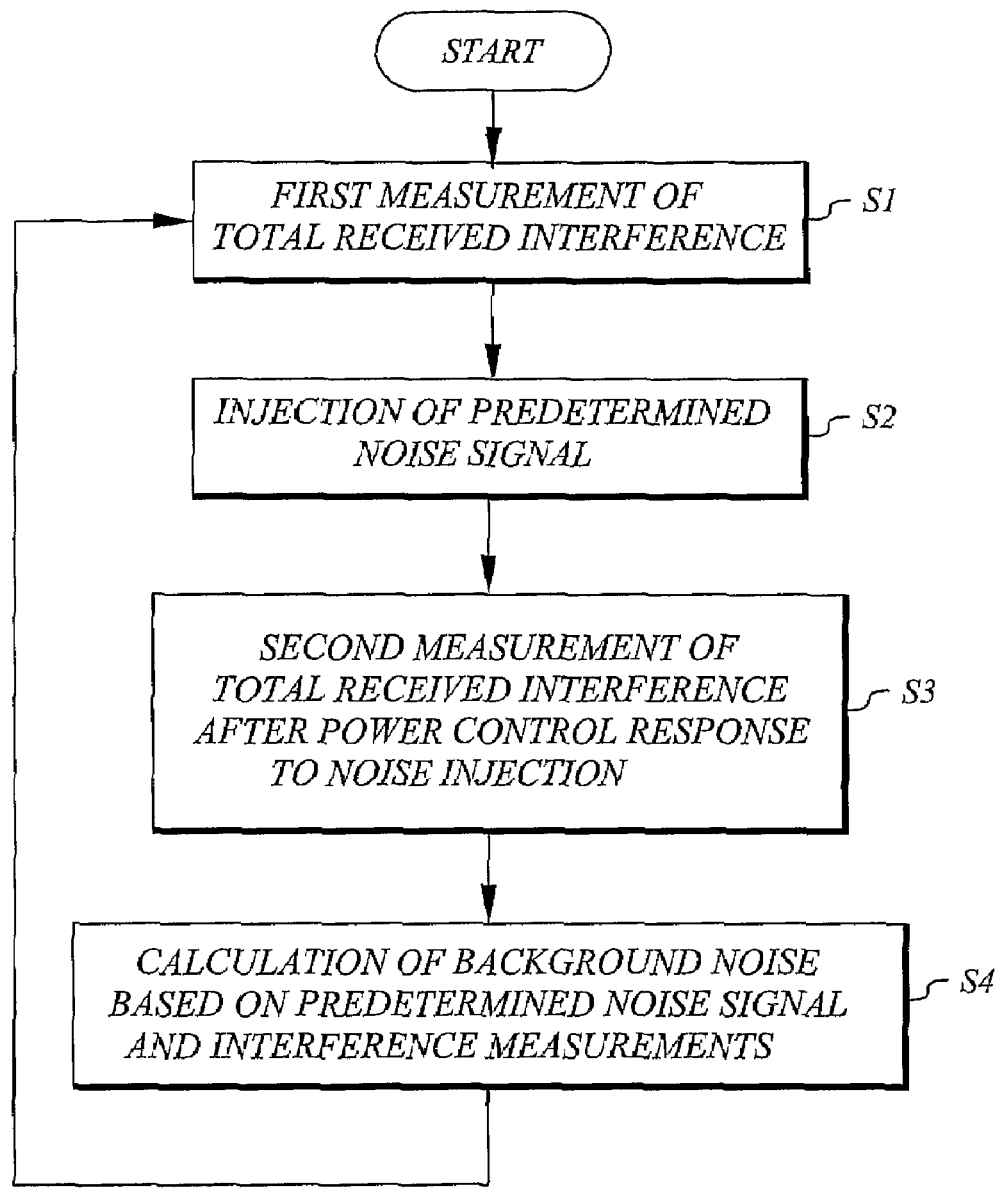
FIG. 6 is a flow chart of a method for background noise estimation in accordance with the present invention.

FIG. 6 is a flow chart summarizing a method for background noise estimation according to a preferred embodiment of the present invention. In a first step S1, the total interference is measured at a receiving unit of a wireless communication system with power control. There is an injection of additional noise to the system through a predetermined noise signal at the receiving unit in a subsequent step S2 and after that the total received interference in the system is measured again in step S3. The predetermined noise signal should comprise at least one signal portion kept substantially constant at a higher level for a period of time. The second interference measurement is preferably performed after a period of time selected so as to allow the power control of the system to stabilize after having responded to the noise injection. In step S4, the background noise is estimated/calculated based on the injected predetermined noise signal and on the interference measurements of steps S1 and S3.

As indicated in the figure, the described procedure is typically repeated a number of times, preferably in an on-line process where the total interference is monitored more or less continuously. The fact that the invention enables estimation of background noise in a system that is up and running constitutes yet another advantageous feature thereof.

According to a particular embodiment of the present invention, the procedure of FIG. 6 is carried out in a receiving unit of the wireless communication system, such as a base station or Node B in an uplink scenario. The noise injection, the measurements of $I_{tot}$ and the calculation of the background noise are then performed at Node B (or corresponding network node(s)). Node B can thereafter make use of the estimates, e.g. for the purposes mentioned above. (In a downlink scenario, the receiving unit is typically the mobile terminal.)

In an alternative uplink embodiment, some functionality of the invention is instead implemented at an overlying control unit, such as the RNC. The noise injection and the measurements of $I_{tot}$ can for example be performed by the Node B, which sends data, including the measurements of $I_{tot}$ and preferably also data defining the injected noise signal, to the RNC over the Iub interface. The calculation of the background noise is then performed by the RNC (or corresponding network node(s)) based on the received data.

The proposed noise estimation mechanism is advantageously simple to implement. Basically, only a few modifications at the receiving side is needed. This means that the present invention can be implemented in a decentralized fashion without requiring any system-wide modifications.

Although the invention has been described with reference to specific illustrated embodiments, it should be emphasized that it also covers equivalents to the disclosed features, as well as modifications and variants obvious to a person skilled in the art. For example, the present invention is well suited for and has primarily been exemplified in connection with WCDMA communication. Nevertheless, it should be understood that it certainly is applicable also on other wireless communication systems with power control functionality. Thus, the scope of the invention is only limited by the enclosed claims.

ABBREVIATIONS

CDMA—Code Division Multiple Access
ISDN—Integrated Services Digital Networks
PLMN—Public Land Mobile Networks
PSTN—Public Switched Telephone Networks
RAN—Radio Access Network
RNC—Radio Network Controller
RoT—Rise over Thermal. The total interference divided by the noise power, generally measured in dB.
RRM—Radio Resource Management
UTRAN—Universal Terrestrial Radio Access Network
WCDMA—Wideband Code Division Multiple Access

REFERENCE

[1] Erik Geijer Lundin, "Uplink load in CDMA Cellular System", Licentiate thesis, Linköping university.

The invention claimed is:

1. A method for estimation of background noise in a wireless communication system with power control, said method comprising the steps of:

measuring, in a first measurement, a first total interference ($I_0$) in the system at a receiving unit of the system;

injecting, at the receiving unit, additional noise to the system through a predetermined noise signal ($\Delta n$);

measuring, in a second measurement, a second total interference ($I_1$) in the system at the receiving unit after injecting the additional noise; and, calculating a background noise (N) in the system based on the predetermined noise signal and the first and second total interference measurements, wherein the background noise (N) equals $((I_0)/(I_1-I_0))\times\Delta n$.

2. The method of claim 1, wherein the second measurement of the total interference is performed a period of time after the noise injection, the period of time being selected so as to allow stabilization of the power control in the system.

3. The method of claim 1, wherein the predetermined noise signal comprises at least one signal portion kept substantially constant at a higher level for a period of time.

4. The method of claim 3, wherein the predetermined noise signal comprises a step signal.

5. The method of claim 3, wherein the predetermined noise signal comprises a pulse signal.

6. The method of claim 1, in a multi-cell communication system, comprising the further step of synchronizing the noise injection such that predetermined noise signals are injected into substantially all cells of the multi-cell communication system substantially simultaneously.

7. The method of claim 1, wherein the calculating step is based on the assumption of a substantially constant noise rise parameter.

8. The method of claim 7, wherein the calculating step comprises using an averaging procedure to compensate for noise rise variations.

9. The method of claim 1, wherein the calculating step is performed at the receiving unit.

10. The method of claim 1, in an uplink scenario, comprising the step of sending data including the total interference measurements from the receiving unit to a control unit and performing the calculating step at the control unit using the data from the receiving unit.

11. A receiving unit with means for estimation of background noise in a wireless communication system with power control, comprising:
- means for a first measurement of a first total interference ($I_0$) in the system;
- means for injecting additional noise to the system through a predetermined noise signal ($\Delta n$); and
- means for a second measurement of a second total interference ($I_1$) in the system after injection of the additional noise, wherein a background noise (N) in the system can be calculated based on the predetermined noise signal and the first and second total interference measurements, wherein the background noise (N) equals $((I_0)/(I_1-I_0))\times\Delta n$.

12. The receiving unit of claim 11, wherein the second measurement of the total interference is performed a period of time after the noise injection, the period of time being selected so as to allow stabilization of the power control in the system.

13. The receiving unit of claim 11, wherein the predetermined noise signal comprises at least one signal portion kept substantially constant at a higher level for a period of time.

14. The receiving unit of claim 13, wherein the predetermined noise signal comprises a step signal.

15. The receiving unit of claim 13, wherein the predetermined noise signal comprises a pulse signal.

16. The receiving unit of claim 11, in a multi-cell communication system, further comprising means for synchronizing the noise injection with noise injection in other cells of the multi-cell communication system.

17. The receiving unit of claim 11, further comprising means for calculating the background noise in the system based on the predetermined noise signal and the first and second total interference measurements.

18. The receiving unit of claim 17, wherein the means for calculating comprises means for calculating the background noise based on the assumption of a substantially constant noise rise parameter.

19. The receiving unit of claim 18, wherein the means for calculating further comprises averaging means arranged to compensate for noise rise variations.

20. The receiving unit of claim 11, comprising a user equipment.

21. The receiving unit of claim 11, further comprising means for transmitting data including the total interference measurements to a control unit, wherein the calculation of the background noise is performed at the control unit using the data.

22. The receiving unit of claim 11, comprising a Node B or base station.

23. A control unit with means for estimation of background noise in a wireless communication system with power control, comprising:
- means for receiving data from a receiving unit of the system, including data from a first measurement of a first total interference ($I_0$) in the system and a second measurement of a second total interference ($I_1$) in the system, the respective first and second measurements being performed before and after injection of additional noise to the system through a predetermined noise signal ($\Delta n$); and,
- means for calculating a background noise (N) in the system based on the predetermined noise signal and the total interference data from the receiving unit, wherein the background noise (N) equals $((I_0)/(I_1-I_0))\times\Delta n$.

24. The control unit of claim 23, wherein the second measurement of the total interference is performed a period of time after the noise injection, the period of time being selected so as to allow stabilization of the power control in the system.

25. The control unit of claim 23, wherein the predetermined noise signal comprises at least one signal portion kept substantially constant at a higher level for a period of time.

26. The control unit of claim 23, wherein the means for calculating comprises means for calculating the background noise based on the assumption of a substantially constant noise rise parameter.

27. The control unit of claim 26, wherein the means for calculating further comprises averaging means arranged to compensate for noise rise variations.

28. The control unit of claim 23, comprising a Radio Network Controller (RNC).

29. A wireless communication system with power control and means for estimation of background noise in the system, comprising a unit according to claim 11.

* * * * *